(12) United States Patent
Zhou et al.

(10) Patent No.: US 12,174,701 B2
(45) Date of Patent: Dec. 24, 2024

(54) FAULT TOLERANT DISAGGREGATED MEMORY

(71) Applicant: Google LLC, Mountain View, CA (US)

(72) Inventors: Yang Zhou, Boston, MA (US); Hassan Mohamed Gamal Hassan Wassel, San Jose, CA (US); Minlan Yu, Belmont, MA (US); Henry M. Levy, Seattle, WA (US); David E. Culler, Berkeley, CA (US); Amin Vahdat, Los Altos, CA (US)

(73) Assignee: Google LLC, Mountain View, CA (US)

( * ) Notice: Subject to any disclaimer, the term of this patent is extended or adjusted under 35 U.S.C. 154(b) by 148 days.

(21) Appl. No.: 18/075,526

(22) Filed: Dec. 6, 2022

(65) Prior Publication Data

US 2023/0185666 A1    Jun. 15, 2023

Related U.S. Application Data

(60) Provisional application No. 63/289,414, filed on Dec. 14, 2021.

(51) Int. Cl.
　　*G06F 11/10*　　(2006.01)
　　*G06F 11/07*　　(2006.01)
(52) U.S. Cl.
　　CPC ...... *G06F 11/1096* (2013.01); *G06F 11/0793* (2013.01); *G06F 11/108* (2013.01)

(58) Field of Classification Search
　　CPC ............. G06F 11/0793; G06F 11/1076; G06F 11/1096; G06F 11/108
　　See application file for complete search history.

(56) References Cited

U.S. PATENT DOCUMENTS

| | | | |
|---|---|---|---|
| 5,604,902 A * | 2/1997 | Burkes | ............... G06F 11/1076 |
| 7,055,058 B2 * | 5/2006 | Lee | .................... G06F 11/1084 |
| | | | 714/6.32 |
| 2016/0308968 A1 | 10/2016 | Friedman | |
| 2020/0159568 A1 | 5/2020 | Goyal et al. | |
| 2021/0303400 A1 | 9/2021 | Li | |
| 2021/0365318 A1 | 11/2021 | Wang et al. | |
| 2023/0010632 A1 * | 1/2023 | Pletka | .................. G06F 3/0688 |

OTHER PUBLICATIONS

International Search Report and Written Opinion for International Application No. PCT/US2022/052345 dated Apr. 28, 2023. 17 pages.

(Continued)

*Primary Examiner* — Joseph R Kudirka
(74) *Attorney, Agent, or Firm* — Lerner David LLP (57) ABSTRACT

Aspects of the disclosure are directed to a low-latency, low-overhead fault tolerant remote memory framework, which packs similar-size in-memory objects into individual page-aligned spans and applies erasure coding on these spans. The framework fully utilizes efficient one-sided remote memory accesses (RMAs) to swap spans in and out using minimal network input/outputs (I/Os), with compaction techniques that reduce remote memory fragmentation. The framework can achieve lower tail latency and higher application performance compared to other fault tolerance solutions, at the cost of potentially more memory usage.

20 Claims, 8 Drawing Sheets

(56) References Cited

OTHER PUBLICATIONS

Zhou et al. Carbink: Fault-Tolerant Far Memory. USENIX, The Advanced Computing Systems Association. Jul. 19, 2022 (Jul. 19, 2022), pp. 1-18, Retrieved from the Internet: <http://www.usenix.org/system/files/osdi22-zhou-yang.pdf>.

Aguilera et al. Designing Far Memory Data Structures: Think Outside the Box. In Proceedings of ACM HotOS, pp. 120-126, 2019.

Aguilera et al. Remote Regions: a Simple Abstraction for Remote Memory. In Proceedings of USENIX ATC, pp. 775-787, 2018.

Amaro et al. Can Far Memory Improve Job Throughput? In Proceedings of ACM EuroSys, pp. 1-16, 2020.

Chen et al. Efficient and Available In-Memory KV-Store with Hybrid Erasure Coding and Replication. ACM Transactions on Storage (TOS), 13(3): pp. 1-30, 2017.

Coppeard. Compacting Garbage Collection in SpiderMonkey. 2015. Retrieved from the Inernet: <https://hacks.mozilla.org/2015/07/compacting-garbage-collection-in-spidermonkey/>. 7 pages.

Dragojevic et al. FaRM: Fast Remote Memory. In Proceedings of USENIX NSDI, pp. 401-414, 2014.

Dragojevic et al. No Compromises: Distributed Transactions with Consistency, Availability, and Performance. In Proceedings of ACM SOSP, pp. 54-70, 2015.

Fenichel et al. A LISP Garbage-Collector for Virtual-Memory Computer Systems. Communications of the ACM, 12 (11): pp. 611-612, 1969.

Gu et al. Efficient Memory Disaggregation with INFINISWAP. In Proceedings of USENIX NSDI, pp. 649-667, 2017.

Kalia et al. FaSST: Fast, Scalable and Simple Distributed Transactions with Two-Sided RDMA Datagram RPCs. In Proceedings of USENIX OSDI, pp. 185-201, 2016.

Korolija et al. Farview: Disaggregated Memory with Operator Off-loading for Database Engines. Jun. 13, 2021. 14 pages.

Lee et al. Mitigating the Performance-Efficiency Tradeoff in Resilient Memory Disaggregation. arXiv preprint arXiv:1910.09727, Oct. 27, 2020. 14 pages.

Li et al. BCStore: Bandwidth-Efficient In-Memory KV-store with Batch Coding. Proc. of IEEE MSST, 2017. 13 pages.

McKenney et al. Read-Copy Update: Using Execution History to Solve Concurrency Problems. In Parallel and Distributed Computing and Systems, vol. 509518, 1998. 11 pages.

Powers et al. MESH: Compacting Memory Management for C/C++ Applications. In Proceedings of ACM PLDI, pp. 333-346, 2019.

Ruan et al. AIFM: High-Performance, Application-Integrated Far Memory. In Proceedings of USENIX OSDI, pp. 315-332, 2020.

Shan et al. LegoOS: A Disseminated, Distributed OS for Hardware Resource Disaggregation. In Proceedings of USENIX OSDI, pp. 69-87, 2018.

Sun Microsystems. Memory Management in the Java HotSpot Virtual Machine, 2006. 21 pages.

Wang et al. Semeru: A Memory-Disaggregated Managed Runtime. In Proceedings of USENIX OSDI, pp. 261-280, 2020.

You et al. Ship Compute or Ship Data? Why Not Both? In Proceedings of USENIX NSDI, pp. 633-651, 2021.

* cited by examiner

FAULT TOLERANT DISAGGREGATED MEMORY

CROSS-REFERENCE TO RELATED APPLICATIONS

The present application claims the benefit of the filing date of U.S. Provisional Patent Application No. 63/289,414 filed Dec. 14, 2021, the disclosure of which is hereby incorporated herein by reference.

BACKGROUND

In a datacenter, matching a particular application to just enough memory and CPUs can be difficult. A commodity server tightly couples memory and compute, hosting a fixed number of central processing units (CPUs) and random access memory (RAM) modules that are unlikely to exactly match the computational requirements of any particular application. Even if a datacenter contains a heterogeneous mix of server configurations, the load on each server, and thus the amount of available resources for a new application, changes dynamically as old applications terminate and new applications arrive. Thus, even cluster schedulers can struggle to efficiently bin-pack the aggregate collection of CPUs and RAM of a datacenter.

Memory is a particularly vexing resource for two reasons. First, for several important types of applications, the amount of memory required can be too big to fit into the RAM of a single machine, even if the entire machine is assigned to a single application instance. Second, for these kinds of applications, alleviating memory pressure by swapping data between RAM and storage would lead to significant application slowdowns, because even SSD accesses are orders of magnitude slower than RAM accesses.

Disaggregated datacenter memory offers a promising solution. In this approach, a CPU can be paired with an arbitrary set of possibly remote RAM modules, with a fast network interconnect keeping access latencies to remote RAM small. Remote memory can be exposed to applications in a variety of ways. For example, an operating system (OS) can treat remote RAM as a swap device, transparently exchanging pages between local RAM and remote RAM. Alternatively, an application-level runtime can expose remoteable pointer abstractions, such that pointer dereferences, or the detection of high memory pressure of the runtime, trigger swaps into and out of remote memory.

However, disaggregated memory can have a lack of fault tolerance. Unfortunately, in a datacenter containing hundreds of thousands of machines, faults are pervasive. These faults arise for a variety of reasons. Some are planned, like the distribution of kernel upgrades that require server reboots, or by a job scheduler killing a task due to the arrival of a higher-priority one. However, many server faults are unpredictable, like those caused by hardware failures, or kernel panic. Thus, any practical system for remote memory has to provide a scalable, fast mechanism to recover from unexpected server failures. Otherwise, the failure rate of an application using remote memory will be much higher than the failure rate of an application that only uses local memory because use of remote memory increases the set of machines whose failure can impact an application.

Fault tolerance can be provided via in-memory replication on remote nodes. However, replication-based approaches suffer from high storage overheads, which result in high network utilization during writes or failure recovery. Fault tolerance can also be provided via erasure coding, which has smaller storage penalties than replication. However, such a coding scheme stripes a single memory page across multiple remote nodes. This means that a compute node requires multiple network fetches to reconstruct a page. Furthermore, computation over that page cannot be outsourced to remote memory nodes since each node contains only a subset of the page bytes.

BRIEF SUMMARY

Aspects of the disclosure are directed to a low-latency, low-overhead fault tolerant remote memory framework, which packs similar-size in-memory objects into individual page-aligned spans and applies erasure coding on these spans. The framework fully utilizes efficient one-sided remote memory accesses (RMAs) to swap spans in and out using minimal network input/outputs (I/Os), with compaction techniques that reduce remote memory fragmentation. The framework can achieve lower tail latency and higher application performance compared to other fault tolerance solutions, at the cost of potentially more memory usage.

An aspect of the disclosure provides for a method. The method includes: writing, by a compute node having two or more spansets, a batch to a remote memory node, where each spanset includes one or more data spans and one or more parity fragments; receiving, by the compute node, one or more spans from the two or more spansets, thereby creating dead space on the remote memory node; rewriting one or more spans into the dead space; and updating the one or more parity fragments.

In an example, updating the one or more parity fragments includes recalculating parity information and issuing a write to the one or more parity fragments. In another example, updating the one or more parity fragments includes issuing a request to the remote memory node to recalculate parity information and issue a write to the one or more parity fragments.

In yet another example, the method further includes executing a compaction thread. In yet another example, executing the compaction thread includes: identifying matched spanset pairs; for each matched spanset pair, creating a new spanset including data including live spans in the matched pair and recomputing and updating the one or more parity fragments; and de-allocating dead spaces in the matched pair.

In yet another example, updating the one or more parity fragments includes: requesting, by the compute node, span deltas from the remote memory; determining, by the compute node, parity deltas based on the span deltas; and pushing, by the compute node, the parity deltas to the parity fragments. In yet another example, updating the one or more parity fragments includes: calculating, by the remote memory node, span deltas; determining, by the remote memory node, parity deltas based on the span deltas; and sending, by the remote memory node, the parity deltas to the parity fragments.

Another aspect of the disclosure provides for a system including one or more processors; and one or more storage devices coupled to the one or more processors and storing instructions that, when executed by the one or more processors, cause the one or more processors to perform operations. The operations include: writing, by a compute node having two or more spansets, a batch to a remote memory node, where each spanset includes one or more data spans and one or more parity fragments; receiving, by the compute node, one or more spans from the two or more spansets, thereby creating dead space on the remote memory node;

rewriting one or more spans into the dead space; and updating the one or more parity fragments.

In an example, updating the one or more parity fragments includes recalculating parity information and issuing a write to the one or more parity fragments. In another example, updating the one or more parity fragments includes issuing a request to the remote memory node to recalculate parity information and issue a write to the one or more parity fragments.

In yet another example, the operations further include executing a compaction thread. In yet another example, executing the compaction thread includes: identifying matched spanset pairs; for each matched spanset pair, creating a new spanset including data including live spans in the matched pair and recomputing and updating the one or more parity fragments; and de-allocating dead spaces in the matched pair.

In yet another example, updating the one or more parity fragments includes: requesting, by the compute node, span deltas from the remote memory; determining, by the compute node, parity deltas based on the span deltas; and pushing, by the compute node, the parity deltas to the parity fragments. In yet another example, updating the one or more parity fragments includes: calculating, by the remote memory node, span deltas; determining, by the remote memory node, parity deltas based on the span deltas; and sending, by the remote memory node, the parity deltas to the parity fragments.

Yet another aspect of the disclosure provides for a non-transitory computer readable medium for storing instructions that, when executed by one or more processors, cause the one or more processors to perform operations. The operations include: writing, by a compute node having two or more spansets, a batch to a remote memory node, where each spanset includes one or more data spans and one or more parity fragments; receiving, by the compute node, one or more spans from the two or more spansets, thereby creating dead space on the remote memory node; rewriting one or more spans into the dead space; and updating the one or more parity fragments.

In an example, updating the one or more parity fragments includes recalculating parity information and issuing a write to the one or more parity fragments. In another example, updating the one or more parity fragments includes issuing a request to the remote memory node to recalculate parity information and issue a write to the one or more parity fragments.

In yet another example, the operations further include executing a compaction thread, where executing the compaction thread includes: identifying matched spanset pairs; for each matched spanset pair, creating a new spanset including data including live spans in the matched pair and recomputing and updating the one or more parity fragments; and de-allocating dead spaces in the matched pair.

In yet another example, updating the one or more parity fragments includes: requesting, by the compute node, span deltas from the remote memory; determining, by the compute node, parity deltas based on the span deltas; and pushing, by the compute node, the parity deltas to the parity fragments. In yet another example, updating the one or more parity fragments includes: calculating, by the remote memory node, span deltas; determining, by the remote memory node, parity deltas based on the span deltas; and sending, by the remote memory node, the parity deltas to the parity fragments.

DETAILED DESCRIPTION

Generally disclosed herein are implementations for a framework for remote memory that provides efficient, high-performance fault recovery. The framework exposes remote memory via application-level remoteable pointers. When the runtime of the framework must evict data from local RAM, the framework writes erasure-coded versions of that data to remote memory nodes. The advantage of erasure coding is that it provides equivalent redundancy to pure replication, while avoiding the double or triple storage overheads that replication incurs. However, straightforward erasure coding is a poor fit for the memory data created by applications written in standard programming languages, like C++ and Go, as those applications allocate variable-sized memory objects, but erasure coding requires equal-sized blocks. To solve this, the framework eschews object-sized swapping strategy and instead swaps at the granularity of spans. A single span includes multiple memory pages that contain objects with similar sizes. The runtime of the framework asynchronously and transparently moves local objects within the spans in local memory, grouping colder objects together and hotter objects together. Hot objects can correspond to data objects that are accessed frequently while cold objects can correspond to data objects that are accessed rarely. Thresholds to determine whether an object is cold or hot can be configurable depending on an amount of local memory in a compute node. Objects can be ranked based on hotness metrics, such as how often the objects are accessed, and the top objects that fit into the local memory of the compute node can be considered hot. When necessary, the framework batch-evicts cold spans, calculating parity bits for those spans at eviction time and writing the associated fragments to remote memory nodes. The framework utilizes one-sided remote memory accesses (RMAs) to efficiently perform swapping activity, minimizing network utilization. The erasure coding scheme of this framework allows a compute node to fetch a remote memory region using a single network request.

In the framework, any given span is contained in one place: the local RAM of a compute node, or the remote RAM of a memory node. Thus, swapping a span from remote RAM to local RAM creates dead space, and thus fragmentation, in remote RAM. On each memory node, the framework runs pause-less defragmentation threads in the background, asynchronously reclaiming space to use for later swap outs from compute nodes.

The framework can achieve lower tail latency and higher application performance compared to other fault tolerance solutions, at the cost of potentially more memory usage. The framework also enables computation to be offloaded to remote memory nodes.

The framework can generally be summarized as including the following: a span-based approach for solving size mismatch between the granularity of erasure coding and the size of the objects allocated by compute nodes; methodologies for defragmenting the RAM belonging to remote memory nodes that store erasure-encoded spans; and an application runtime that hides spans, object migration within spans, and erasure coding from application-level developers.

Overview

Figure 1:
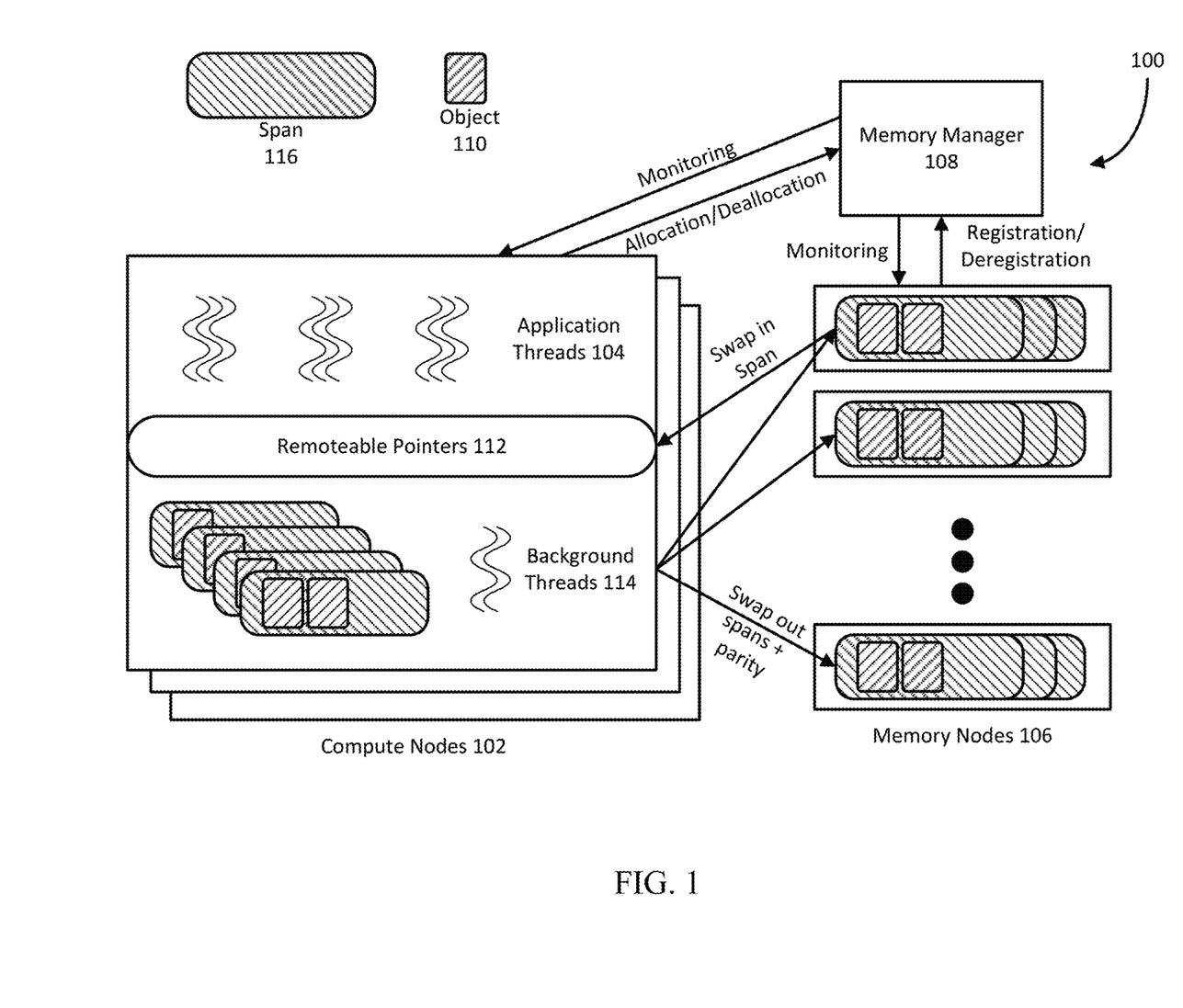
FIG. 1 depicts a block diagram of an example architecture according to aspects of the disclosure.

FIG. 1 depicts a block diagram an example architecture 100 of the framework for remote memory that provides fault tolerance. The architecture 100 includes a plurality of compute nodes 102 that can execute application threads 104. The architecture 100 further includes a plurality of memory nodes 106 that can provide remote memory the compute nodes 102 use to store application data that cannot fit in local RAM. The architecture 100 also includes a logically centralized memory manager 108 that can track the liveness of the compute nodes 102 and memory nodes 106. The memory manager 108 also can coordinate assignment of remote memory regions, including one or more memory nodes 106, to the compute nodes 102.

A memory node 106 can make a local memory region available to compute nodes 102 by registering the region with the memory manager 108. If a compute node 102 requires remote memory, the compute node 102 can send an allocation request to the memory manager 108. The memory manager 108 then can assign a registered, unallocated region. Upon receiving a deallocation message from a compute node 102, the memory manager 108 can mark the associated region as available for use by other compute nodes. A memory node 106 can request the memory manager 108 to deregister a previously registered, but currently unallocated region, withdrawing the region from a global pool of remote memory.

The framework does not require participating machines to use custom hardware. For example, any machine in a datacenter can be a memory node 106 if that machine runs a memory host daemon for the framework. Similarly, any machine can be a compute node 102 if the applications of that compute node 102 use the runtime for the framework.

The runtime allows a program to dynamically allocate and deallocate memory objects 110 of arbitrary size. Programs can access those objects 110 through remoteable pointers 112. When applications dereference pointers 112 that refer to non-local, e.g., swapped-out, objects 110, the framework can pull the desired objects 110 from remote memory. The framework can use background threads 112 to detect when to evict cold local objects 110 to remote memory based on local memory pressure.

The runtime manages objects 110 using spans 116 and spansets. A span 116 can correspond to a contiguous run of memory pages. A single region allocated by a compute node 102 can contain one or more spans 116. The framework can round up each object allocation to the bin size of the relevant span 116 and align each span 116 to the page size used by compute nodes 102 and memory nodes 106. The framework can swap remote memory into local memory at the granularity of a span 116 and can swap local memory out to remote memory at the granularity of a spanset, e.g., a collection of spans 116 of the same size. In preparation for swap-outs, the background threads 114 on the compute nodes 102 can group cold objects into cold spans and bundle a group of cold spans into a spanset. At eviction, the background threads 114 can generate erasure-coding parity data for the spanset, and then evict the spanset and the parity data to remote nodes. The framework simplifies memory management and fault tolerance as well as simplifying failure recovery and avoiding the need for expensive coherence traffic. The framework can employ a read-copy-update (RCU) scheme to synchronize access between the application threads 104 and the background threads 114.

Failure Model

The framework assumes the logically centralized memory manager 108 is implemented via a replicated state machine and thus will not fail. Instead, the framework assumes that memory nodes 106 and compute nodes 102 may experience faults in a fail-stop manner. The memory manager 108 can track the liveness of both memory nodes 106 and compute nodes 102 via sending and receiving heartbeat data packets.

When a compute node 102 fails, the memory manager 108 can instruct the memory nodes 106 to deallocate the relevant spans 116. An application may also use an application-level fault tolerance scheme, such as checkpointing, to ensure that application-level data is recoverable.

When a memory node 106 fails, the memory manager 108 can deregister regions of the failed memory node from the global pool of remote memory. Erasure-coding recovery of the regions of the failed memory node is initiated by a compute node 102 when the compute node 102 unsuccessfully tries to read or write a span 116 belonging to the failed memory node. If an application thread 104 on the compute node 102 tries to read a span 116 that is currently being recovered, the read can use a degraded read protocol, which reconstructs the span 116 using data from other spans and from parity blocks.

Remoteable Pointers

Figure 2:
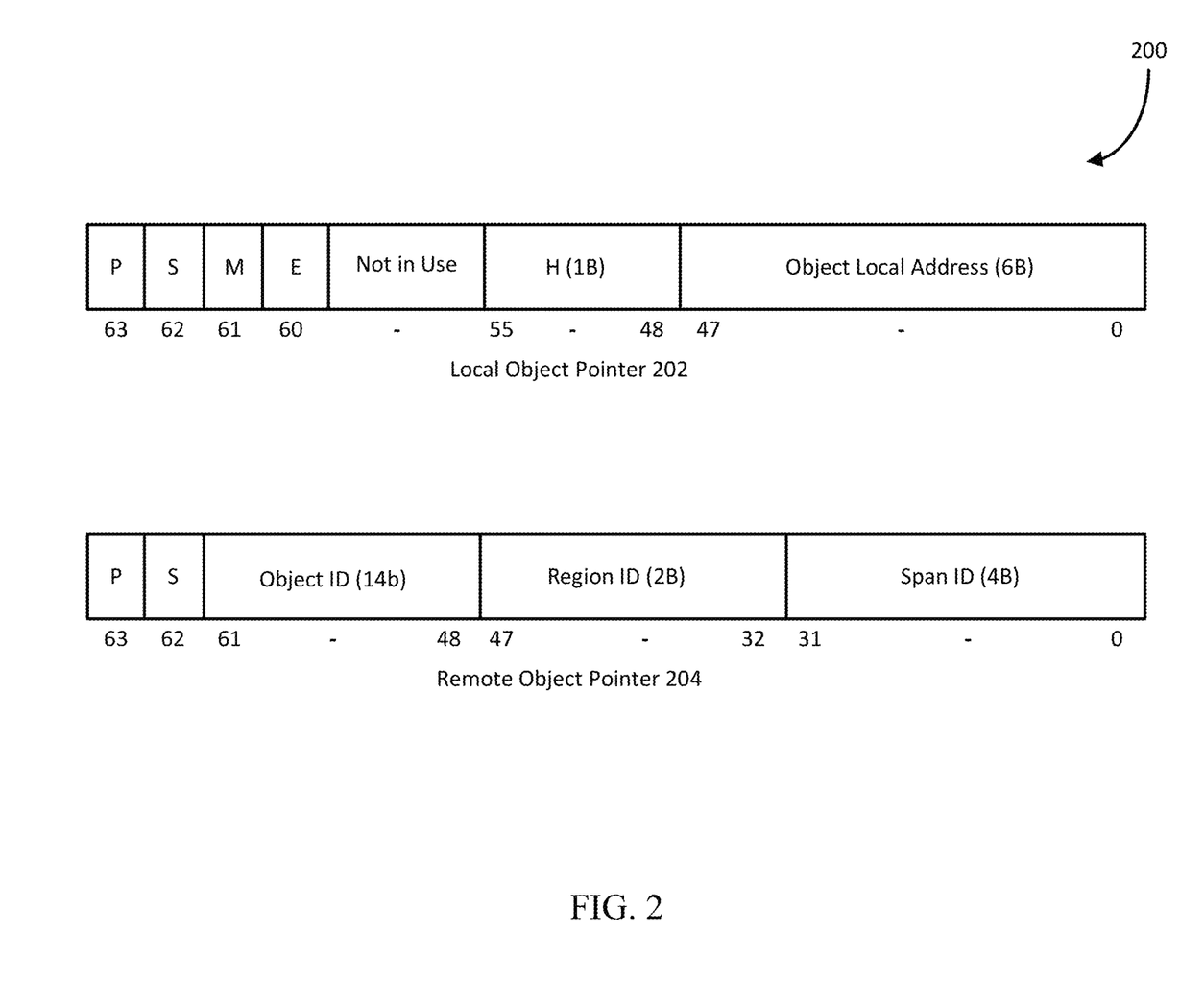
FIG. 2 depicts example pointers for local objects and remote objects according to aspects of the disclosure.

The framework can expose remote memory through smart pointers, such as pointers 200 depicted in FIG. 2 for local objects 202 and remote objects 204. The pointer encodings represent span information. The pointers can have a size of 8 bytes, as an example.

The present bit P can indicate whether the pointed-to object 110 resides in local memory. The shared bit S can indicate whether a pointer implements unique-pointer semantics or shared-pointer semantics. Unique pointers can only allow a single reference to a pointed-to object 110 while shared pointers can have multiple references to a pointed-to object 110. The moving bit M and the evicting bit E can synchronize object accesses between the application threads 104 and the background threads 114. The hotness byte H can be consulted by the background threads 114 when deciding whether an object 110 is cold and thus a priority for eviction.

For local object pointers 202, the local virtual address of the object 110 is directly embedded in the pointer 202 via an object local address. For remote, e.g., evicted, object pointers 204, the pointer 204 can describe how to locate the object 110. The remote object pointers 204 can include an object ID that indicate the location of an object 110 within a particular span 116, a span ID to identify that span 116, and a region ID to denote the remote memory region that contains the span 116.

The framework can support two smart pointer types: unique pointers and shared pointers. Unique pointers only allow one reference to the underlying object 110 while shared pointers allow multiple references to the underlying object 110.

When moving or evicting an object 110, the background threads 114 can locate and update the smart pointers, which reference the object 110, by embedding a reverse pointer in each object 110. The reverse pointer can point to the unique pointer or first shared pointer that references the object 110. For example, an individual shared pointer can be 16 bytes large, with 8 bytes dedicated to a pointer that references the next shared pointer on the list. The runtime can thus find all of an object's shared pointers by discovering the first pointer via the reverse pointer of the object and then iterating across the linked list pointers in each shared pointer.

Span-Based Memory Management

Figure 3:
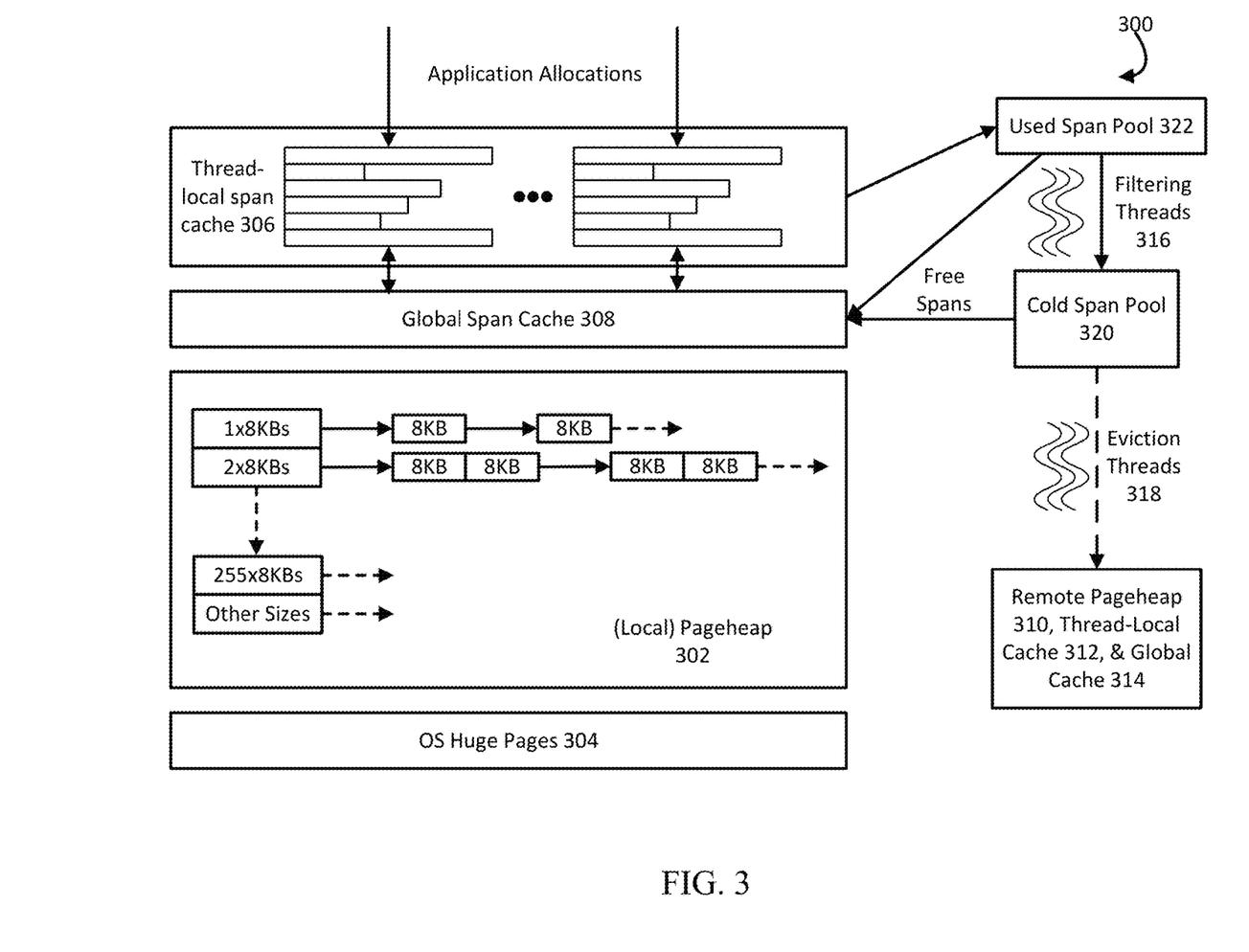
FIG. 3 depicts a block diagram of an example span-based memory management according to aspects of the disclosure.

FIG. 3 depicts a block diagram of an example span-based memory management 300. A span corresponds to a contiguous set of pages that contain objects of the same size class. When an application allocates a new object, the framework tries to round the object size up to the nearest size class and allocate a free object slot from an appropriate span. If the object is bigger than the largest size class, the framework rounds the object size up to the nearest aligned size and allocates a dedicated span to hold the object. As an example, the framework can support 86 different size classes and align each span on an 8 KB boundary.

To allocate spans locally, the runtime can use a local page heap 302. The local page heap 302 can correspond to an array of free lists, with each list tracking aligned free spans of a particular size, such as 2 MB, 4 MB, etc. A span allocation request for b bytes can check the free list containing spans of that size. If there are no available spans in that list, the framework can check the free lists for increasingly larger size classes. If a free span is found of size s, the framework can split the span into chunks of size b and s-b, returning the former to the application and inserting the latter into the relevant free list. If no free spans are found, the framework can allocate a new one by requesting huge pages 304 from the OS, such as 2 MB huge pages. When a span is deallocated, the framework can merge the span with an adjacent one of the same size if the adjacent span is free. The framework can then insert the newly deallocated span into the appropriate free list.

Allocating and deallocating via the local page heap 302 can be protected by a spinlock. Each split or merge can involve two free lists and several application threads may try to concurrently issue allocations or deallocations that cause splits or merges. To reduce contention on the local page heap 302, each thread can reserve a private, e.g., thread-local, cache 306 of free spans for each size class. The framework can also maintain a global cache 308 of free lists, with each list having its own spinlock. When a thread wants to allocate a span whose size can be handled by one of the predefined size classes, the thread can first try to allocate from the thread local cache 306, then the global cache 308, and finally the local page heap 302. For larger allocation requests, threads can allocate spans directly from the local page heap 302. The framework may not perform merging or splitting for the global cache 308 or the thread-local caches 306, to keep those operations off the fast path.

The framework can associate each span with several pieces of metadata, including an integer that describes the size class of the span and a bit vector that indicates which object slots are free. To map a locally resident object to its associated span metadata, the framework can use a local page map, such as a two-level radix tree. The lookup procedure can correspond to a page table walk. For example, the first 20 bits of a virtual address index of an object can be mapped into the first-level radix tree table and the next 15 bits index can be mapped into a second-level radix tree table. The same mapping approach allows the framework to map the virtual address of a locally resident span to the span metadata.

On a compute node, locally resident spans contain a subset of a memory state of an application. The rest of that state is stored in remote spans that live in remote memory regions. Recall from FIG. 2, that a pointer to a non-local object embeds the region ID and span ID of the object.

To allocate or deallocate a region, a compute node can send a request to the memory manager. For example, a single memory region can be 1 GB or larger, to target applications whose total memory requirements are hundreds or thousands of GBs. Upon successfully allocating a region, the compute node can update a region table which maps the region ID of the allocated region to the associated remote memory node.

A compute node can manage remote spans and remote regions using additional data structures that are analogous to the ones that manage local spans. A compute node can use a remote page heap 310 to handle the allocation and deallocation of remote spans belonging to allocated regions. A remote page map can associate a remote span ID with metadata that can name the enclosing region as a region ID and describe the offset of the remote span within that region.

The framework can include a private remote cache 312 for each application thread as well as a global remote cache 314 that can be visible to all application threads. To swap out a local span of size s, a compute node can first use the remote page heap 310, or a remote cache 312, 314, if possible, to allocate a free remote span of size s. Similarly, after a compute node swaps in a remote span, the node can deallocate the remote span, returning the remote span to its source, either the remote page heap 310 or a remote cache 312, 314.

The runtime can execute filtering threads 316 that iterate through the objects in locally resident spans and move those objects to different local spans. Object shuffling aims to create hot spans, containing only hot objects, and cold spans, containing only cold objects. When local memory pressure is high, eviction threads 318 prefer to swap out spansets containing cold spans. The framework can track object hotness using garbage collection-style read/write barriers, including utilizing a cold span pool 320 and a used span pool 322. Thus, by the time that a filtering thread 316 examines an object, the hotness byte in the pointer of the object has already been set. Upon examining the hotness byte, a filtering thread 316 can update the byte using an algorithm.

Object shuffling also allows the framework to garbage collect dead objects by moving live objects to new spans and then deallocating the old spans. During eviction, the framework can utilize efficient one-sided RMA writes to swap spansets out to remote memory nodes. This approach allows the framework to avoid software-level overheads, e.g., associated with thread scheduling, on the remote node.

From the perspective of an application, object movement and spanset eviction are transparent. This transparency is possible because each object embeds a reverse pointer that allows filtering threads 316 and evicting threads 318 to determine which smart pointers require updating.

The framework can swap remote memory into local memory at the granularity of a span. As with swap-outs, the framework can use one-side RMAs for swap-ins. Swapping at the granularity of a span simplifies remote memory management, since compute nodes only have to remember how spans map to memory nodes, as opposed to how the much larger number of objects map to memory nodes.

However, swapping in at span granularity instead of object granularity has a potential disadvantage: if a compute node swaps in a span containing multiple objects, but only uses a small number of those objects, then the compute node will have wasted network bandwidth to fetch the unneeded objects and CPU time to update the remoteable pointers for those unneeded objects. These penalties can be collectively referred to as swap-in amplification. To reduce the likelihood of swap-in amplification, the eviction threads 318 can prioritize the scanning and eviction of spans containing large objects. These kinds of spans contain fewer objects per span; thus, swapping in these spans will reduce the expected number of unneeded objects.

Fault Tolerance Via Erasure Coding

Erasure coding provides data redundancy with lower storage overhead compared to other replication. However, the design space for erasure coding schemes can be more complex. The framework seeks to minimize both average and long-tail access penalties for remote objects as well as efficiently recover from the failure of memory nodes.

To motivate erasure-coding at the spanset granularity, first consider an approach that erasure-codes individual spans. In this approach, to swap-out a span, a compute node can break the span into data fragments, generate the associated parity fragments, and then write the entire set of fragments to remote nodes. During the swap-in of a span, a compute node can fetch multiple fragments to reconstruct the target span. With this scheme, which can be referred to as EC-Split, handling the failure of memory nodes during swap-out or swap-in is straightforward; the compute node who is orchestrating the swap-out or swap-in can detect the memory node failure, select a replacement memory node, trigger span reconstruction, and then restart the swap-in or swap-out. The disadvantage of EC-Split is that, to reconstruct a single span, a compute node must contact multiple memory nodes to pull in all of the needed fragments. This requirement to contact multiple memory nodes makes the swap-in operation vulnerable to stragglers, and thus high tail latency.

Another approach is to erasure-code across a group of equal-sized spans, referred to as a spanset. In this approach, each span in the spanset can be treated as a fragment, with parity data computed across all of the spans in the set. To reconstruct a span, a compute node merely has to contact the single memory node which stores the span. The framework can use this approach to minimize tail latencies.

Erasure-coding at the spanset granularity but swapping in at the span granularity does introduce complications involving parity updates. The reason is that swapping in a span leaves a span-sized hole in the backing spanset, causing fragmentation. Determining how to garbage-collect the hole and update the relevant parity information is non-trivial. Ideally, a scheme for garbage collection and parity updating would not incur overhead on the critical path of swap-ins or swap-outs. An ideal scheme would also allow parity recalculations to occur at either compute nodes or memory nodes, to enable opportunistic exploitation of free CPU resources on both types of nodes.

Machines can use remote procedure calls (RPCs) to communicate. RPCs involve software-level overheads on both sides of a communication. The framework can avoid these overheads by using one-side RMA, which can offload work to the NIC hardware belonging to communication endpoints. However, in and of itself, RMA does not automatically solve the consistency issues that arise when offloading parity calculations to remote nodes.

The framework can use an EC-Batch Local and EC-Batch Remote scheme for erasure-coding. Both schemes can erasure-code at spanset granularity, using RMA for swap-in as well as swap-out. Swap-ins can occur at the granularity of a span, but swap-outs can occur at the granularity of spansets; thus, both EC-Batch approaches deallocate a backing area of a span in remote memory upon swapping that span into local RAM of a compute node. The result is that swap-ins can create dead space on a remote memory node. Both EC-Batch schemes can reclaim dead space and recalculate parity data using asynchronous garbage collection. EC-Batch Local can always recalculate parity on compute nodes, whereas EC-Batch Remote can recalculate parity on compute nodes or memory nodes. When EC-Batch Remote offloads parity computations to remote nodes, EC-Bach Remote can employ a pipelined commit scheme that avoids the latencies of a two-phase commit.

Figure 4:
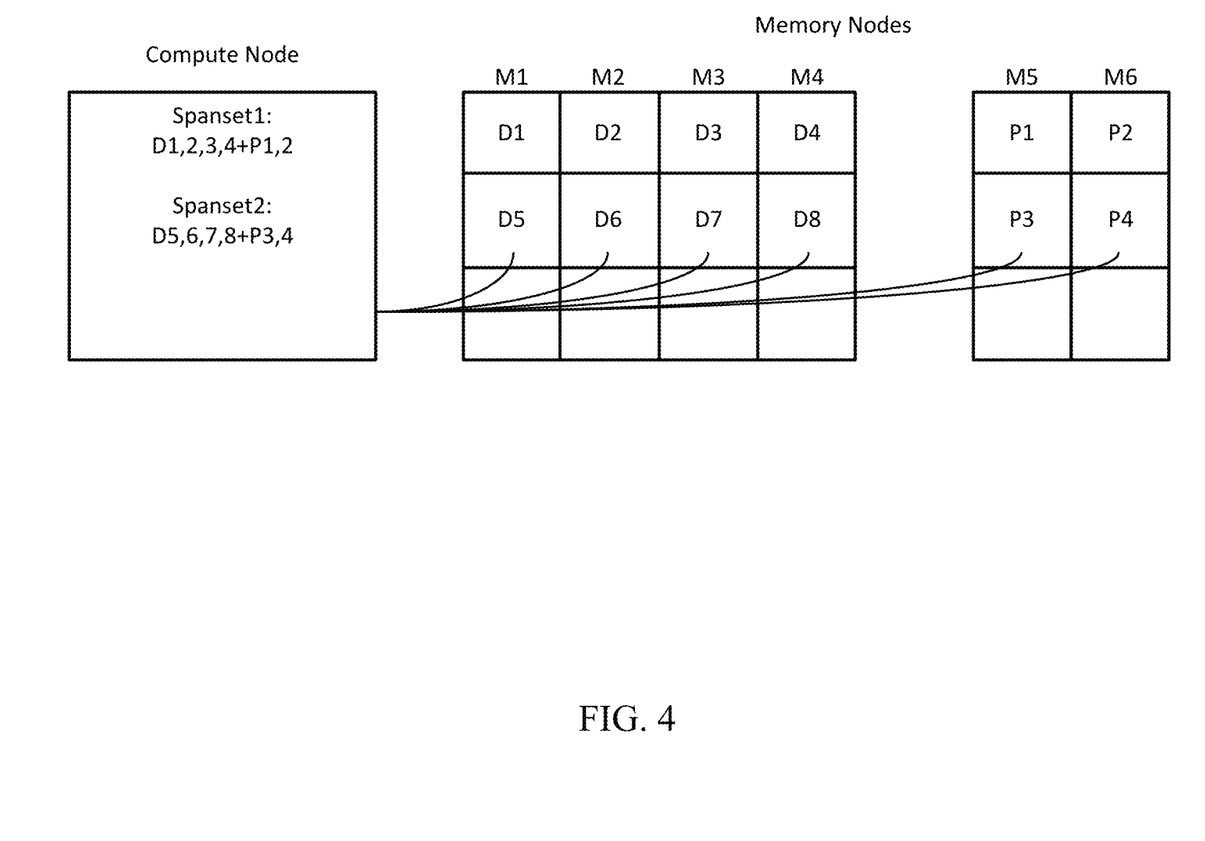
FIG. 4 depicts an example swapping out of spans and parity in a batch according to aspects of the disclosure.

In both varieties of EC-Batch, a spanset can contain multiple spans of the same size. At swap-out time, a compute node can write a batch, e.g., a spanset and its parity fragments, to a remote memory node. FIG. 4 depicts an example of swapping out span and parity in a batch. In this example, the compute node has two spansets: spanset1 includes data spans <D1, D2, D3, D4> and parity fragments <P1, P2> and spanset2 includes data spans <D5, D6, D7, D8> and parity fragments <P3, P4>. The framework can use error correcting code, such as Reed-Solomon code, to generate parity information and prioritize the eviction of spansets that contain cold spans. Neither variant of EC-Batch overwrites spansets in place, so eviction may require a compute node to request additional remote memory regions from the memory manager.

When an application tries to access an object that is currently remote, the runtime can inspect the application pointer and extract the Span ID. The runtime can consult the remote page map to discover which remote node holds the span. Finally, the runtime can initiate the appropriate RMA operation to swap in the span.

Figure 5:
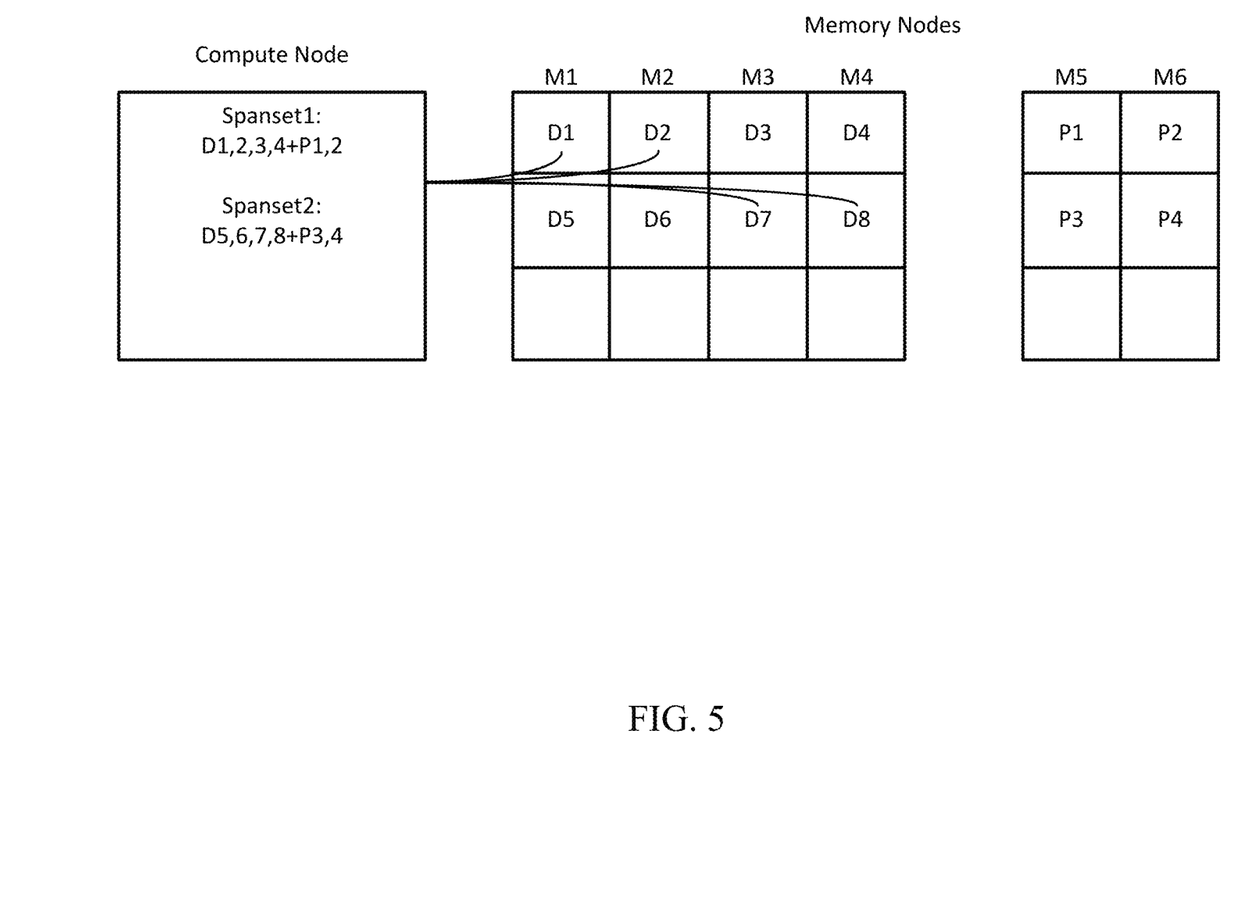
FIG. 5 depicts an example swapping in of individual spans according to aspects of the disclosure.

However, swapping in at the span granularity creates remote fragmentation. As depicted in FIG. 5, the compute node in the running example has pulled four spans into local memory: D1, D2, D7, and D8. Any particular span lives exclusively in local memory or remote memory; thus, the swap-ins of the four spans creates dead space on the associated remote memory nodes. If the framework wants to fill, for example, the dead space of D1 with a new span D9, the framework must update parity fragments P1 and P2. Those parity fragments can depend on both D1 and D9.

For updating P1 and P2, the compute node can perform two approaches: read D1 into local memory, recalculate the necessary parity information, and then issue writes to P1; or send D9 to memory node M1, and request that M1 compute the new parity data and update P1 and P2. The second approach can require a protocol like 2-phase commit (2PC) to guarantee the consistency of data fragments and parity fragments. Without such a protocol, if M1 fails after updating P1, but before updating P2, the parity information can be out-of-sync with the data fragments.

The first approach, in which the compute node orchestrates the parity update, can avoid the inconsistency challenges of the second approach. If a memory node dies in the midst of a parity update, the compute node can detect the failure, pick a new memory node to back the parity fragment, and retry the parity update. If the compute node dies in the midst of the parity update, then the memory manager can simply deallocate all regions belonging to the compute node.

Unfortunately, both approaches can require a lot of network bandwidth to fill holes in remote memory. To reclaim one vacant span, the first approach can require three span-sized transfers—the compute node must read D1 and then write P1 and P2. The second approach can require two span-sized transfers to update P1 and P2. To reduce these network overheads, the framework can perform remote compaction to defragment remote memory using fewer network resources than the two approaches above.

Figure 6:
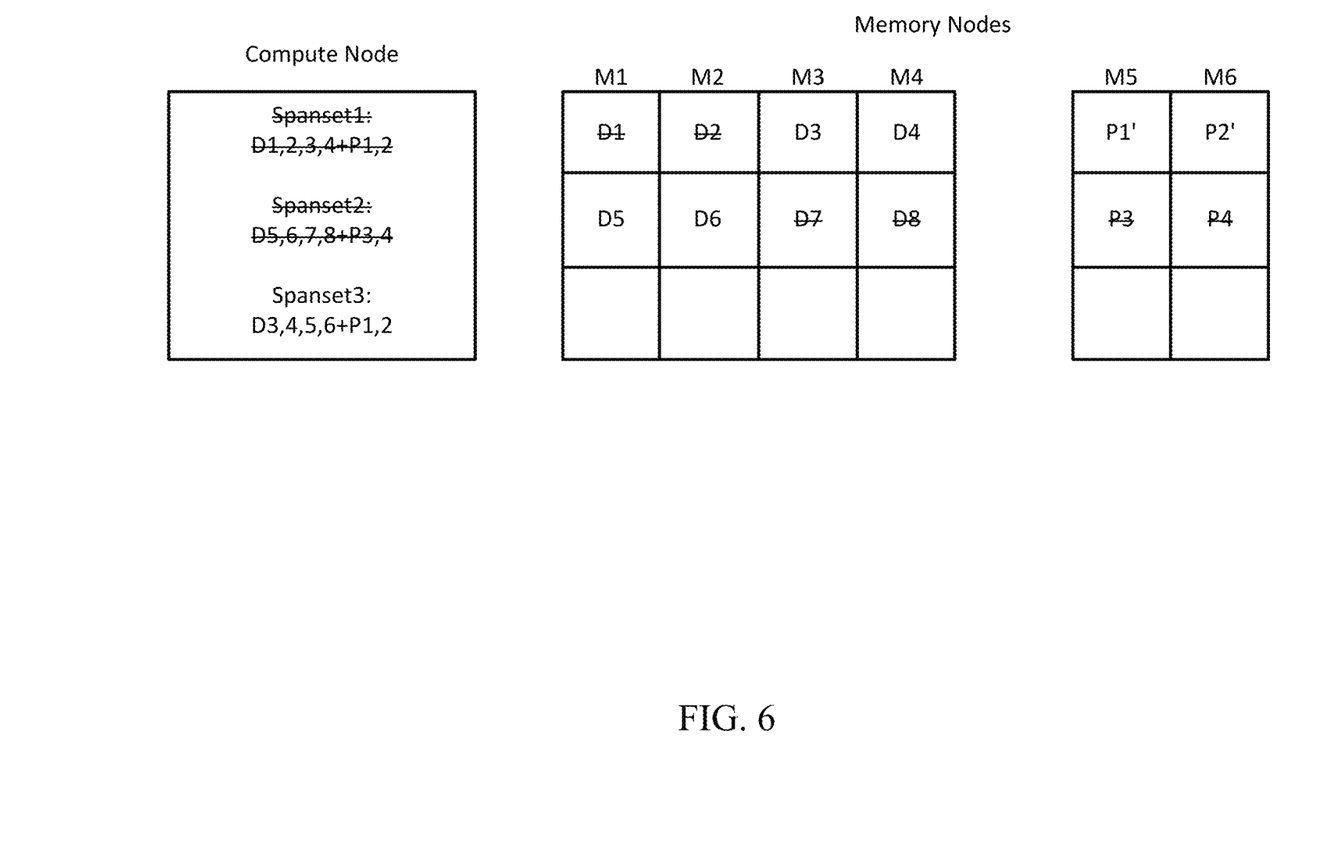
FIG. 6 depicts an example of compaction merging spansets to reclaim spans according to aspects of the disclosure.

On a compute node, the runtime can execute several compaction threads. These threads look for "matched" span-set pairs; in each pair, the span positions containing dead space in one set are occupied in the other set, and vice versa. For example, the two spansets in FIG. 5 are a matched pair. Once the compaction threads find a matched pair, they create a new spanset whose data includes the live spans in the matched pair, e.g., <D3, D4, D5, D6> in FIG. 5. The compaction threads can recompute and update the parity fragments P1' and P2'. The compaction threads can deallocate the dead spaces in the matched pair, e.g., <D1, D2, D7, D9, P3, P4> in FIG. 5, resulting in a situation as depicted in FIG. 6. Compaction can occur in the background and use error correcting codes, such as Reed-Solomon codes over a Galois field GF ($2^8$). The new parity information to be calculated in FIG. 6 can therefore be represented by the following equations on GF ($2^8$):

$$P1'-P1 = A_{1,1}(D5-D1) + A_{2,1}(D6-D2)$$

$$P2'-P2 = A_{1,2}(D5-D1) + A_{2,2}(D6-D2)$$

where $A_{i,j}$ ($i \in \{0,1,2,3\}$, $j \in \{0,1\}$) are fixed coefficient vectors in the Reed-Solomon code. The framework can provide two approaches for updating the parity information.

In EC-Batch Local, the compute node that triggered the swap-out can orchestrate the updating of parity data. In the running example, the compute node asks M1 to calculate the span delta D5-D1 and asks M2 to calculate the span delta D6-D2. After retrieving those updates, the compute node can determine the parity deltas, e.g., P1'-P1 and P2'-P2, and can push those deltas to the parity nodes M5 and M6.

In EC-Batch Remote, the compute node can offload the parity recalculation and updating to memory nodes. In the running example, the compute node can ask M1 to calculate the span delta D5-D1, and M2 to calculate the span delta D6-D2. The compute node also asks M1 and M2 to calculate partial parity updates, e.g., $A_{1,1}$ (D5-D1) and $A_{1,2}$ (D5-D1) on M1. M1 and M2 are then responsible for sending the relevant partial parity updates to the parity nodes. For example, M1 sends $A_{1,1}$ (D5-D1) to M5, and $A_{1,2}$ (D5-D1) to M6.

Remote compaction can reduce network overheads. In the context of FIGS. 4-6, EC-Batch Local recovers four dead spans using four span-sized network transfers and EC-Batch Remote can require four span-sized network transfers, plus some small messages generated by the consistency protocol, to recover four dead spans.

The pipelined 2PC protocol can treat each remote compaction as a transaction and can overlap/pipeline a commit phase of a previous transaction with a preparation phase of a current transaction to avoid extra communication cost for commit messages. The protocol can run multiple transactions, each including the preparation and the commit phases, concurrently for better throughput, as long as EC-Batch Remote does not issue two concurrent compactions for the same spanset.

Figure 7:
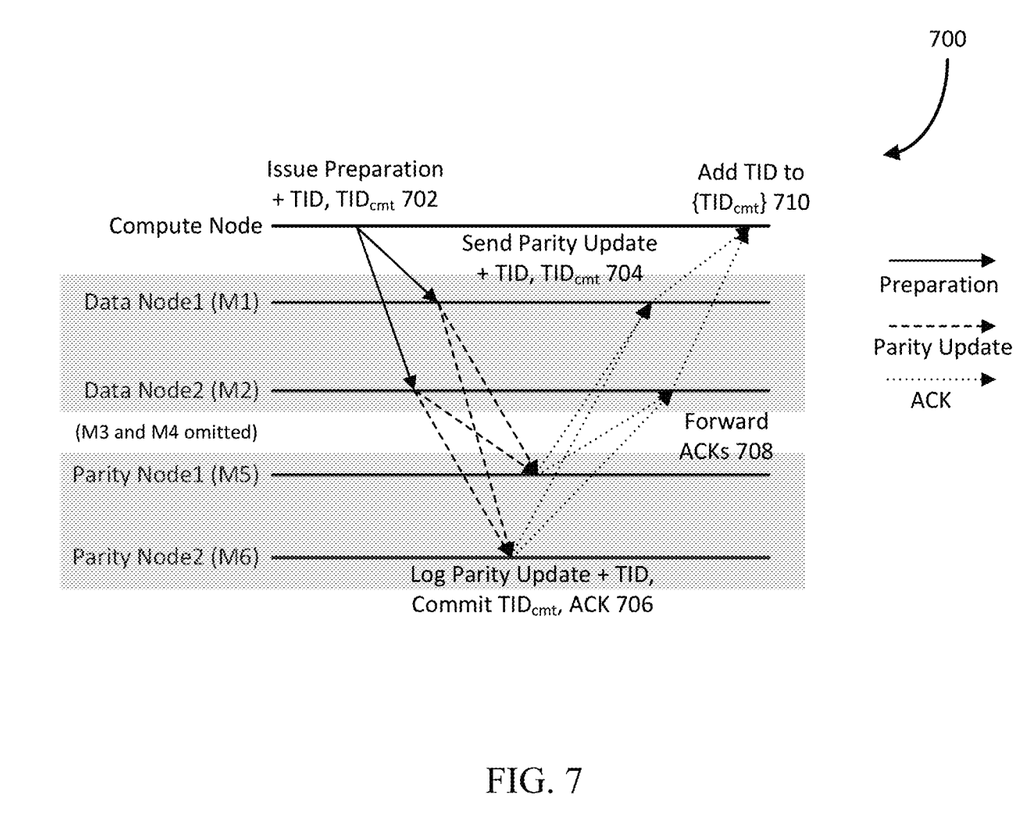
FIG. 7 depicts a flow diagram of an example 2-phase commit protocol according to aspects of the disclosure.

FIG. 7 depicts an example flow diagram 700 for how the protocol can handle the compaction, using the example of FIG. 6. The compute node can assign each transaction with a unique transaction ID, referred to as a TID. The compute node can maintain a set of TIDs whose transactions are committable, e.g., a transaction just finishes its preparation phase and waits for commit, denoted as $\{TID_{cmt}\}$. Each parity node can maintain an in-memory buffer temporarily store in-coming parity updates indexed by TID.

For each remote compaction, at step 702, the compute node can send the preparation RPCs with the TID to all involved memory nodes, e.g., M1 and M2 in FIG. 6. At step 704, the RPC handler on each memory node can calculate parity updates and send the parity update RPCs to all parity nodes together with the TID. At step 706, each parity node then records the parity update data and the targeted parity location into the in-memory buffer indexed by the TID. At step 708, the parity node can respond with an acknowledgement (ACK) to the memory node; after the memory node receives ACKs from all parity nodes, it can ACK with the TID to the compute nodes. At step 710, once the compute node receives ACKs from all involved memory nodes, the compute node can add the TID to $\{TID_{cmt}\}$, meaning this compaction is committable. Multiple remote compactions that touch different spansets can start their preparation phases concurrently.

Before sending a preparation RPC, the compute node can check if there is any committable transaction in $\{TID_{cmt}\}$. If one exists, the compute node can takes a $TID_{cmt}$ and piggyback it in the preparation RPCs for memory nodes at step 702. Afterward, the memory nodes can issue parity update RPCs to all parity nodes, which also piggyback the $TID_{cmt}$ at step 704. Once a parity node receives an $TID_{cmt}$, the parity node can look up the in-memory buffer to commit all parity updates belonging to this $TID_{cmt}$, e.g., adding the parity updates to the targeted parity location on GF ($2^8$) at step 706.

Depending on the CPU and network resources in the remote memory node, EC-Batch can transparently switch between the Local version and the Remote version. When switching from Local to Remote, EC-Batch first stops issuing Local-version compactions, e.g., reading data updates, calculating and sending parity updates, then immediately starts issuing Remote-version compactions, e.g., sending preparation RPCs with piggybacked commit messages. The switching completes once all in-flight Local-version compactions have been processed. Likewise, switching from Remote to Local works the reverse order.

Failure Recovery

The framework can handle two types of memory node failures: planned failure and unplanned failure. Planned failures occur expectedly and are scheduled by a cluster manager, such as for BIOS, kernel, or management software upgrades, file system reformatting, etc. Unplanned failures occur unexpectedly, such as failures caused by power outage, defective hardware, rack switch failure, kernel panic, or lockup, etc.

When the cluster manager schedules planned failures, it can send a notification to jobs running on the affected nodes prior to shutting down. Once a memory node receives such notification, it can notify the memory manager, which allocates new memory regions from new nodes and notifies all the affected compute nodes. Each compute node can then stop using the affected memory node for evicting spans but can continue swapping in spans from the notified nodes. Meanwhile, the memory manager can orchestrate the migration of regions from the affected nodes to the new nodes. After migration completes, the compute node can update the mapping between the region ID and memory node to map the migrated regions to new nodes.

Compute nodes can detect an unplanned failure of memory nodes by a network connection timeout or more sophisticated leasing protocols. Once detecting such an unplanned failure, the affected compute nodes can continue their applications by replacing all swap-ins targeting at the failed memory node with degraded reads. Compute nodes can also spawn background threads to reconstruct the lost data in a new memory node.

The framework can support online span data reconstruction via degraded reads, where compute nodes can read a sufficient number of spans and parity from other memory nodes and use erasure coding to reconstruct the lost span data. Using the example in FIG. 4, if M1 fails unexpectedly, in order to swap in data span D1, compute node can swap in data span D2, D3, D4 and parity P1, then reconstruct data span D1 via erasure coding. Degraded read can guarantee that any memory node failure does not block the application, but only slows down the application.

For background reconstruction, each compute node can first snapshot all spansets in the system while in parallel requesting a new memory region, on a new memory node, from the memory manager. Then the compute node can orchestrate the new memory node to read a sufficient number of data spans and parity from other nodes based on the spanset mapping and reconstruct the lost data via erasure coding. The compute node can stop issuing any compaction request that involves the failed memory node. The compute node can also abort any in-flight compaction with failed transfers from the failed memory node. For EC-Batch Local, the abort can only end this compaction without changing any spanset metadata. For EC-Batch Remote, the compute node can additionally send the TID of aborted compaction to parity nodes to trim the parity update records.

As long as the number of failed nodes does not exceed the number of parity nodes, the framework can recover from cascading failures, where another memory node fails when the system is recovering from one memory node failure. The framework can store and maintain all remote memory states, such as the remote page heap and spanset metadata, in a local compute node. Any further memory node failure does not impact the remote memory management and data-parity consistency.

Thread Synchronization

The framework can synchronize object accesses among three types of threads: application threads that read/write objects, filtering threads that move objects, and eviction threads that reclaim space. The framework can leverage RCU locking to implement an object read/write barrier for application threads. The filtering or eviction threads can set the barrier by setting the moving or evicting bits in remoteable pointers indicating object state, e.g., moving or evicting, and then can rely on RCU writer waiting to guarantee that application threads can observe the pointer state.

To access objects, applications threads can acquire a RCU reader lock and can check object states based on the bit fields in remoteable pointers while, in the background, filtering and eviction threads can change object states and call the RCU writer waiting before moving or reclaiming objects. As a result, if an object is local and not in a moving/evicting state, reads/writes from the application threads would not be affected during the lifetime of the RCU reader lock. If the object is remote, a library code for the framework can automatically swap in the corresponding span for application threads.

In case an object is in the moving/evicting state, the framework can synchronize concurrent object accesses between application threads and filtering/eviction threads. The framework achieves this by letting these threads race and execute compare-and-swap (CAS) to clear the moving/evicting state. If the application threads win, they can make a copy of the object and read/write the new object. If the filtering/eviction threads win, they can do the object moving or reclaiming. Threads that fail the race can continue to check the object states for application threads or reclaim/skip the old object for filtering/eviction threads.

Computing Overview

Figure 8:
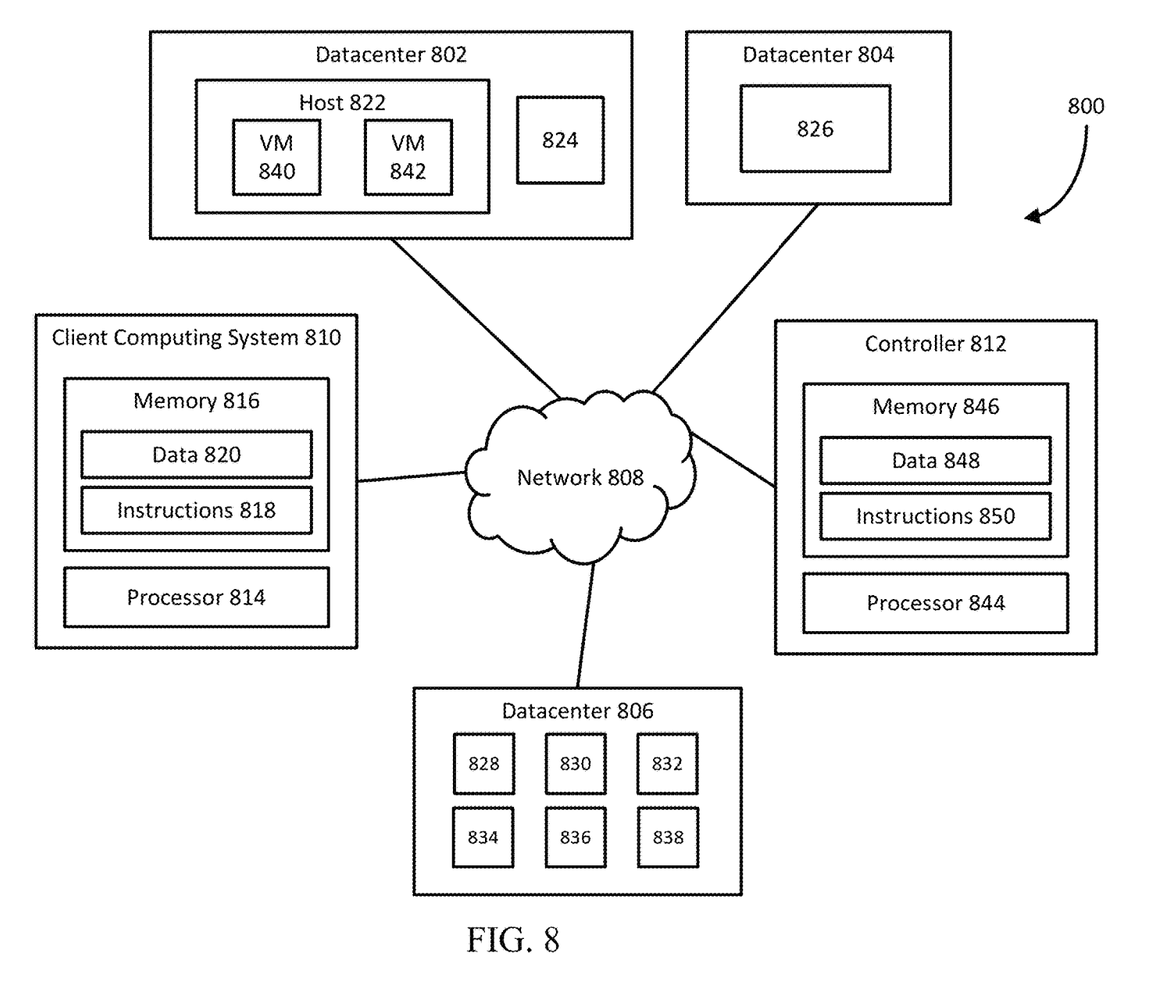
FIG. 8 depicts a block diagram of an example computing environment according to aspects of the disclosure.

FIG. 8 depicts an example system according to the implementations for the framework disclosed herein, including a distributed computing environment 800. A plurality of datacenters 802, 804, 806 can be communicatively coupled, for example, over a network 808. The datacenters 802, 804, 806 can further communicate with one or more client devices, such as client 810, over the network 808. Thus, for example, the client 810 can execute operations in "the cloud." In some examples, the datacenters 802, 804, 806 can further communicate with a controller 812.

Each client 810 can be a personal computer or a mobile device, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by a processor, speakers, a modem and/or network interface device, user input, such as a mouse, keyboard, touch screen or microphone, and all of the components used for connecting these elements to one another. Moreover, computers in accordance with the implementations described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 810 can contain a processor 814, memory 816, and other components typically present in general purpose computers. The memory 816 can store information accessible by the processor 814, including instructions 818 that can be executed by the processor 814. Memory can also include data 820 that can be retrieved, manipulated, or stored by the processor 814. The memory 816 can be a type of non-transitory computer readable medium capable of storing information accessible by the processor 814, such as a hard-drive, solid state drive, tape drive, optical storage, memory card, ROM, RAM, DVD, CD-ROM, write-capable, and read-only memories. The processor 814 can be a well-known processor or other lesser-known types of processors. Alternatively, the processor 814 can be a dedicated controller such as an ASIC.

The instructions 818 can be a set of instructions executed directly, such as machine code, or indirectly, such as scripts, by the processor 814. In this regard, the terms "instructions," "steps" and "programs" can be used interchangeably herein. The instructions 818 can be stored in object code format for direct processing by the processor 814, or other types of computer language including scripts or collections of independent source code modules that are interpreted on demand or compiled in advance.

The data 820 can be retrieved, stored, or modified by the processor 814 in accordance with the instructions 818. For instance, although the implementations are not limited by a particular data structure, the data 820 can be stored in computer registers, in a data store as a structure having a plurality of different fields and records, or documents, or buffers. The data 820 can also be formatted in a computer-readable format such as, but not limited to, binary values, ASCII, or Unicode. Moreover, the data 820 can include information sufficient to identify relevant information, such as numbers, descriptive text, proprietary codes, pointers, references to data stored in other memories, including other network locations, or information that is used by a function to calculate relevant data.

Although FIG. 8 functionally illustrates the processor 814 and memory 816 as being within the same block, the processor 814 and memory 816 can actually include multiple processors and memories that may or may not be stored within the same physical housing. For example, some of the instructions 818 and data 820 can be stored on a removable CD-ROM and others within a read-only computer chip. Some or all of the instructions 818 and data 820 can be stored in a location physically remote from, yet still accessible by, the processor 814. Similarly, the processor 814 can actually include a collection of processors, which may or may not operate in parallel.

The datacenters 802, 804, 806 can be positioned a considerable distance from one another. For example, the datacenters 802, 804, 806 can be positioned in various countries around the world. Each datacenter 802, 804, 806 can include one or more computing devices, such as processors, servers, shards, or the like. For example, as shown in FIG. 8, datacenter 802 includes computing devices 822, 824, datacenter 804 includes computing device 826, and datacenter 806 includes computing devices 828-838. According to some examples, the computing devices can include one or more virtual machines running on a host machine. For example, computing device 822 can be a host machine, supporting a plurality of virtual machines 840, 842 running an operating system and applications. While only a few virtual machines 840, 842 are illustrated in FIG. 8, it should be understood that any number of virtual machines may be supported by any number of host computing devices. Moreover, it should be understood that the configuration illustrated in FIG. 8 is merely an example, and that the computing devices in each of the example datacenters 802, 804, 806 can have various structures and components that may be the same or different from one another.

Programs can be executed across these computing devices, for example, such that some operations are executed by one or more computing devices of a first datacenter while other operations are performed by one or more computing devices of a second datacenter. In some examples, the computing devices in the various datacenters can have different capacities. For example, the different computing devices can have different processing speeds, workloads, etc. While only a few of these computing devices are shown, it should be understood that each datacenter 802, 804, 806 can include any number of computing devices, and that the number of computing devices in a first datacenter may differ from a number of computing devices in a second datacenter. Moreover, it should be understood that the number of computing devices in each datacenter 802, 804, 806 can vary over time, for example, as hardware is removed, replaced, upgraded, or expanded.

In some examples, each datacenter 802, 804, 806 can also include a number of storage devices (not shown), such as hard drives, random access memory, disks, disk arrays, tape drives, or any other types of storage devices. The datacenters 802, 804, 806 can implement any of a number of architectures and technologies, including, but not limited to, direct attached storage (DAS), network attached storage (NAS), storage area networks (SANs), fibre channel (FC), fibre channel over Ethernet (FCOE), mixed architecture networks, or the like. The datacenters 802, 804, 806 can include a number of other devices in addition to the storage devices, such as cabling, routers, etc. Further, in some examples the datacenters 802, 804, 806 can be virtualized environments. Further, while only a few datacenters 802, 804, 806 are shown, numerous datacenters may be coupled over the network 808 and/or additional networks.

In some examples, the controller 812 can communicate with the computing devices in the datacenters 802, 804, 806, and can facilitate the execution of programs. For example, the controller 812 can track the capacity, status, workload, or other information of each computing device, and use such information to assign tasks. The controller 812 can include a processor 844 and memory 846, including data 848 and instructions 850, similar to the client 810 described above. The controller 812 can be configured to redistribute or repartition data stored among the computing devices in the datacenters 802, 804, 806. The controller 812 can be further configured to implement the framework as described herein.

Client 810, datacenters 802, 804, 806, and controller 812 can be capable of direct and indirect communication such as over network 808. For example, using an Internet socket, a client 810 can connect to a service operating on remote servers through an Internet protocol suite. Servers can set up listening sockets that may accept an initiating connection for sending and receiving information. The network 808, and intervening nodes, may include various configurations and protocols including the Internet, World Wide Web, intranets, virtual private networks, wide area networks, local networks, private networks using communication protocols proprietary to one or more companies, Ethernet, Wi-Fi, e.g., 702.71, 702.71$b$, $g$, $n$, or other such standards, and RPC, HTTP, and various combinations of the foregoing. Such communication may be facilitated by a device capable of transmitting data to and from other computers, such as modems, e.g., dial-up, cable or fiber optic, and wireless interfaces.

Client 810 can request access to data stored in the computing devices of the data centers 802, 804, 806. Such request may be handled by the controller 812 and/or one or more of the computing devices in datacenters 802, 804, 806. In some examples, a response to a request may involve or otherwise require manipulation of the data, such as using the operations described in greater detail herein.

Conclusion

As such, generally disclosed herein are implementations for a low-latency, low-overhead fault tolerance system for remote memory that employs a span-centric approach to manage remoteable memory and erasure coding scheme for fault tolerance. The implementations utilize efficient one-sided RMA to swap spans between compute nodes and remote memory nodes, augmented with compaction techniques to reduce remote memory fragmentation.

Unless otherwise stated, the examples described herein are not mutually exclusive, but may be implemented in various combinations to achieve unique advantages. As these and other variations and combinations of the features discussed above can be utilized without departing from the subject matter defined by the claims, the description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    writing, by a compute node having two or more spansets, a batch to a remote memory node, wherein each spanset comprises one or more data spans and one or more parity fragments;
    receiving, by the compute node, one or more spans from the two or more spansets, thereby creating dead space on the remote memory node;
    rewriting one or more spans into the dead space; and
    updating the one or more parity fragments.

2. The method of claim 1, wherein updating the one or more parity fragments comprises recalculating parity information and issuing a write to the one or more parity fragments.

3. The method of claim 1, wherein updating the one or more parity fragments comprises issuing a request to the remote memory node to recalculate parity information and issue a write to the one or more parity fragments.

4. The method of claim 1, further comprising executing a compaction thread.

5. The method of claim 4, wherein executing the compaction thread comprises:
    identifying matched spanset pairs;
    for each matched spanset pair:
        creating a new spanset including data comprising live spans in the matched pair; and
        recomputing and updating the one or more parity fragments; and
    de-allocating dead spaces in the matched pair.

6. The method of claim 5, wherein updating the one or more parity fragments comprises:
    requesting, by the compute node, span deltas from the remote memory node;
    determining, by the compute node, parity deltas based on the span deltas; and
    pushing, by the compute node, the parity deltas to the one or more parity fragments.

7. The method of claim 5, wherein updating the one or more parity fragments comprises:
    calculating, by the remote memory node, span deltas;
    determining, by the remote memory node, parity deltas based on the span deltas; and
    sending, by the remote memory node, the parity deltas to the one or more parity fragments.

8. A system comprising:
    one or more processors; and
    one or more storage devices coupled to the one or more processors and storing instructions that, when executed by the one or more processors, cause the one or more processors to perform operations comprising:
        writing, by a compute node having two or more spansets, a batch to a remote memory node, wherein each spanset comprises one or more data spans and one or more parity fragments;
        receiving, by the compute node, one or more spans from the two or more spansets, thereby creating dead space on the remote memory node;
        rewriting one or more spans into the dead space; and
        updating the one or more parity fragments.

9. The system of claim 8, wherein updating the one or more parity fragments comprises recalculating parity information and issuing a write to the one or more parity fragments.

10. The system of claim 8, wherein updating the one or more parity fragments comprises issuing a request to the remote memory node to recalculate parity information and issue a write to the one or more parity fragments.

11. The system of claim 8, wherein the operations further comprise executing a compaction thread.

12. The system of claim 11, wherein executing the compaction thread comprises:
    identifying matched spanset pairs;
    for each matched spanset pair:
        creating a new spanset including data comprising live spans in the matched pair; and
        recomputing and updating the one or more parity fragments; and
    de-allocating dead spaces in the matched pair.

13. The system of claim 12, wherein updating the one or more parity fragments comprises:
    requesting, by the compute node, span deltas from the remote memory node;
    determining, by the compute node, parity deltas based on the span deltas; and
    pushing, by the compute node, the parity deltas to the one or more parity fragments.

14. The system of claim 12, wherein updating the one or more parity fragments comprises:
    calculating, by the remote memory node, span deltas;
    determining, by the remote memory node, parity deltas based on the span deltas; and
    sending, by the remote memory node, the parity deltas to the one or more parity fragments.

15. A non-transitory computer readable medium for storing instructions that, when executed by one or more processors, cause the one or more processors to perform operations comprising:
    writing, by a compute node having two or more spansets, a batch to a remote memory node, wherein each spanset comprises one or more data spans and one or more parity fragments;
    receiving, by the compute node, one or more spans from the two or more spansets, thereby creating dead space on the remote memory node;
    rewriting one or more spans into the dead space; and
    updating the one or more parity fragments.

16. The non-transitory computer readable medium of claim 15, wherein updating the one or more parity fragments comprises recalculating parity information and issuing a write to the one or more parity fragments.

17. The non-transitory computer readable medium of claim 15, wherein updating the one or more parity fragments comprises issuing a request to the remote memory node to recalculate parity information and issue a write to the one or more parity fragments.

18. The non-transitory computer readable medium of claim 15, wherein the operations further comprise executing a compaction thread, wherein executing the compaction thread comprises:
- identifying matched spanset pairs;
- for each matched spanset pair:
  - creating a new spanset including data comprising live spans in the matched pair; and
  - recomputing and updating the one or more parity fragments; and
- de-allocating dead spaces in the matched pair.

19. The non-transitory computer readable medium of claim 18, wherein updating the one or more parity fragments comprises:
- requesting, by the compute node, span deltas from the remote memory node;
- determining, by the compute node, parity deltas based on the span deltas; and
- pushing, by the compute node, the parity deltas to the one or more parity fragments.

20. The non-transitory computer readable medium of claim 18, wherein updating the one or more parity fragments comprises:
- calculating, by the remote memory node, span deltas;
- determining, by the remote memory node, parity deltas based on the span deltas; and
- sending, by the remote memory node, the parity deltas to the one or more parity fragments.

* * * * *